United States Patent [19]
Krauss et al.

[11] Patent Number: 4,583,704
[45] Date of Patent: Apr. 22, 1986

[54] PNEUMATIC SYSTEM STRUCTURE FOR CIRCULATION CONTROL AIRCRAFT

[75] Inventors: Timothy A. Krauss, Harwinton; Stephan Roman, Shelton; Robert J. Beurer, West Haven, all of Conn.

[73] Assignee: United Technologies Corporation, Hartford, Conn.

[21] Appl. No.: 565,433

[22] Filed: Dec. 27, 1983

[51] Int. Cl.$^4$ .............................. B64C 27/12
[52] U.S. Cl. ................ 244/17.11; 416/20 A; 416/90 A; 244/207
[58] Field of Search ............ 244/207, 17.11, 7 R, 244/7 A; 416/90 R, 90 A, 20

[56] References Cited

U.S. PATENT DOCUMENTS 3,464,650 9/1969 Girard ................ 416/90 A

FOREIGN PATENT DOCUMENTS 205240 12/1908 Fed. Rep. of Germany ... 416/90 A
304250 8/1920 Fed. Rep. of Germany ... 416/90 A

OTHER PUBLICATIONS

Reader et al., "Status Report on Advanced Devel. Prog. Utilizing CCR Technology", Sep. 1978, Ass. Italy of Astronautics and Aeronautics.
Barnes et al., "CCR Flight Demonstration", Aug. 1976, American Helicopter Society Symposium.

Primary Examiner—Galen L. Barefoot
Attorney, Agent, or Firm—Russell M. Lipes, Jr.

[57] ABSTRACT

A plenum for a circulation control rotor aircraft which surrounds the rotor drive shaft (18) and is so constructed that the top (32), outer (38) and bottom (36) walls through which compressed air is admitted are fixed to aircraft structure and the inner wall (34) through which air passes to rotor blades (14) rotates with the drive shaft and rotor blades.

1 Claim, 2 Drawing Figures

PNEUMATIC SYSTEM STRUCTURE FOR CIRCULATION CONTROL AIRCRAFT

The Government has rights in this invention pursuant to NASA Contract No. NAS2-11058.

TECHNICAL FIELD

This invention relates to the rotor and pneumatic system structure for an aircraft utilizing a circulation control rotor system and more particularly to the plenum chamber construction.

BACKGROUND ART

An X-wing aircraft is a rotary wing aircraft that uses a rigid rotor/wing utilizing circulation control airfoils. The rotor is driven mechanically and the rotor blades operate essentially in fixed pitch. The rotor may rotate, as in a helicopter, or it may be stopped and positioned so as to act like a fixed wing. Collective and cyclic control is achieved by control of air circulation about the blade airfoils. This is done by blowing compressed air through leading edge and trailing edge ducts in the rotor blades and modulating the amount of air being ejected through spanwise slots on the leading and trailing edges of the rotor blades.

The rotor system for an X-wing aircraft includes a hub and attached rotor blades and a pneumatic system for delivering compressed air separately to the leading edge and the trailing edge of the individual rotor blades at a desired pressure and mass flow. The pneumatic system includes a compressor, a stationary air supply to the rotor, valving for controlling the flow of air to the leading edge and the trailing edge of the blades, and a rotating air distribution arrangement. The system also includes a compressed, air storage chamber, or plenum, and it is the plenum which is the subject of this invention. A plenum chamber construction is described in copending application Ser. No. 431,475 filed Sept. 20, 1982.

A circulation control rotor system is described in the report titled "Circulation Control Rotor Flight Demonstrator" by David R. Barnes, Douglas G. Kirkpatrick and George A. McCoubrey presented at an American Helicopter Society Mideast Region Symposium in August, 1976. The report titled "Status Report on Advanced Development Program Utilizing Circulation Control Rotor Technology" by Kenneth R. Reader, Douglas G. Kirkpatrick and Robert M. Williams, Paper No. 44 presented at the Fourth European Rotorcraft and Powered Lift Aircraft Forum, Stresa, Italy, September 13-15, 1978 describes an X-wing development program.

Davidson et al U.S. Pat. No. 3,139,936 and Flint et al U.S. Pat. Nos. 3,348,618 and 3,349,853 describe a control mechanism for a helicopter having circulation control with compressed air being supplied through the rotor pillar. Cheeseman et al U.S. Pat. No. 3,524,711 and Seed U.S. Pat. No. 3,567,332 describe helicopter rotors employing circulation control.

DISCLOSURE OF INVENTION

An object of the present invention is to provide an improved plenum chamber construction for the pneumatic system of an aircraft having a circulation control rotor system.

Another object of the invention is to provide a pneumatic system plenum chamber for a circulation control aircraft which is relatively safer and more compact because of its construction.

Still another object of the invention is the provision of a plenum chamber in the pneumatic system of a circulation control aircraft in which the rotating members are inside the chamber away from the helicopter airframe.

The foregoing and other objects and advantages of the present invention may be seen by referring to the following description and claims, read in conjunction with the accompanying drawings.

BEST MODE FOR CARRYING OUT THE INVENTION

Figure 1:
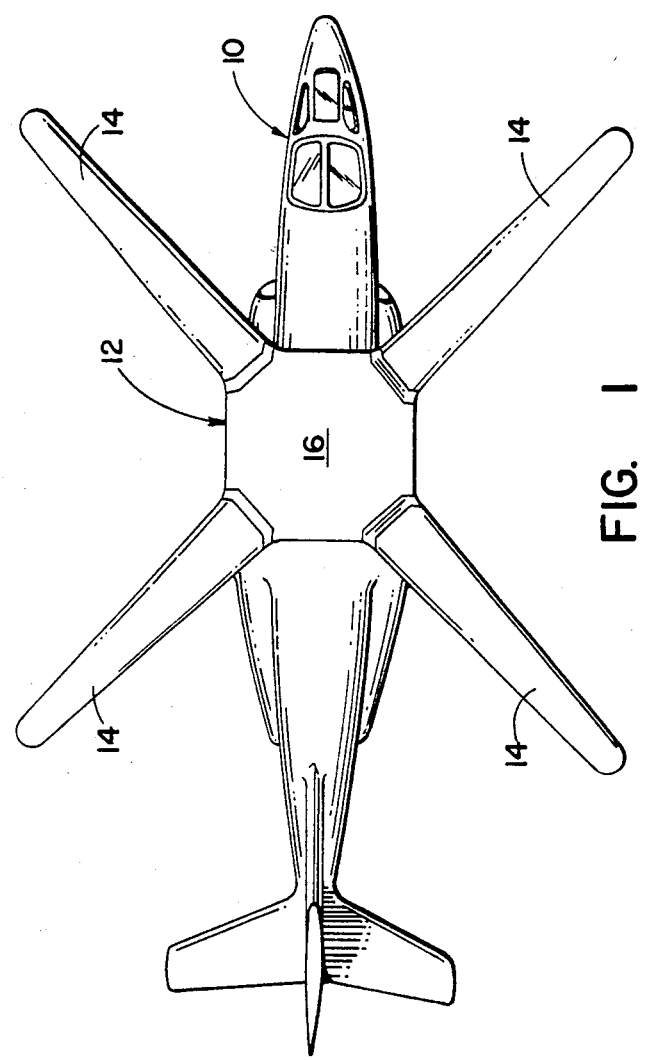
FIG. 1 is a top view of a circulation control aircraft of the X-wing type.

The aircraft of FIG. 1 includes fuselage 10 on top of which is mounted rotor system 12 including four blades 14 and hub portion 16. Blades 14 are circulation control airfoils, each blade having leading edge and trailing edge slots through which compressed air from a pneumatic system is ejected. Control is obtained by cyclically and collectively modulating the amount of ejected airflow. In certain flight regimes such as landing and taking off, the rotor system rotates, and in other flight regimes such as forward flight the rotor system is stationary and is stored in the position shown.

Figure 2:
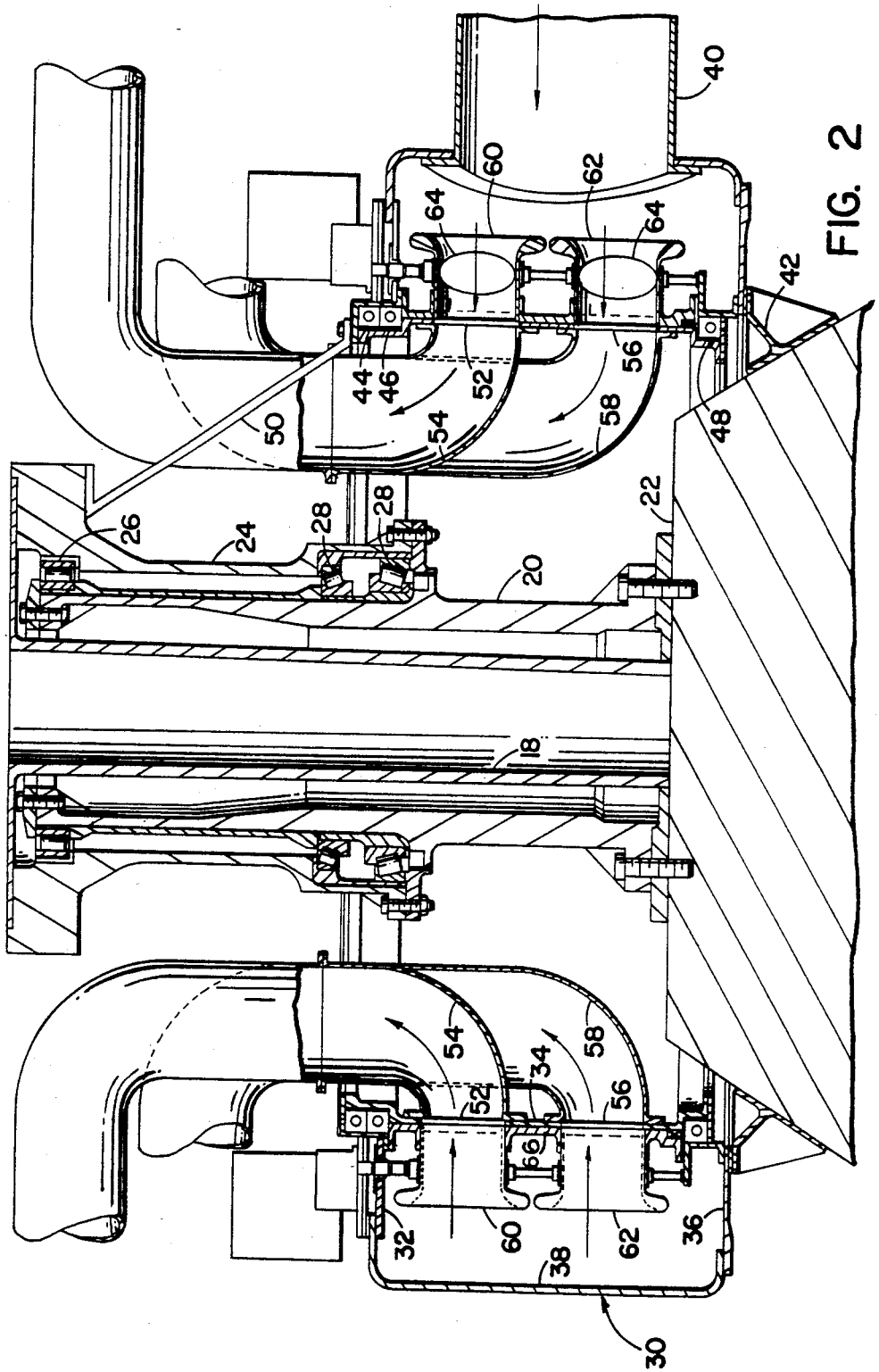
FIG. 2 is a schematic section through the rotor system hub area of the aircraft of FIG. 1 showing the pneumatic system plenum chamber and associated structure.

In FIG. 2 the hub portion of the rotor system and the area below it is shown schematically in some detail. Rotor drive shaft 18 which is connected to and drives the rotor blades is supported by standpipe 20 which surrounds the drive shaft and is fixedly connected to transmission housing 22. The upper end of the drive shaft is connected to and guided by sleeve 24 which surrounds the upper end of the standpipe. Bearings 26 and 28 provide for relative rotational movement between the standpipe and sleeve and carry the load.

Plenum 30, the compressed air storage chamber, surrounds the rotor shaft and is located under and as near as possible to the plane of rotation of the rotor blades. The plenum includes top annular wall 32, inner circumferential wall 34, bottom annular wall 36, and outer circumferential wall 38 as the principal elements defining the air storage chamber. Compressed air is delivered to the plenum through one or more pipes 40 connected to the outer wall although the air could be delivered through the bottom wall. Top wall 32, outer wall 38 and bottom wall 36 are joined together as a unit and this unit is fixed to and supported by annular flange 42 which is fixed to transmission housing 22.

Inner circumferential wall 34 is a rotating wall, being connected to and rotating with the rotor system. Bearings 44 and 46 between inner wall 34 and top wall 32 and bearing 48 between the inner wall and bottom wall 36 are provided for and permit rotation of the inner wall which is connected to sleeve 24 by a number of brackets 50. The inner wall has a plurality of ports at two circumferential levels for the delivery of air to each rotor blade 14. One or more upper ports 52 is connected by duct 54 to a rotor blade to provide air to the leading edge slot in the blade, and one or more ports 56 is connected by duct 58 to the same rotor blade to provide air to the trailing edge slot in the blade. The inner wall, air ducts and rotor blades thus rotate as a unit, and by their position the inner wall and ducts are at an interior location away from the helicopter airframe and generally in a safer and more compact location than if they rotated about the outer circumference of the plenum.

Within plenum 30 are two circumferential levels of bell-mouth passageways having valves therein to control the flow of air from the plenum to the rotor blades, the passageways being evenly spaced circumferentially around the plenum. Upper passageways 60 are aligned axially with inner wall upper ports 52 to control air to the leading edge of the rotor blades, and lower passageways 62 are aligned axially with inner wall lower ports 56 to control air to the trailing edge of the rotor blades. Adjustable butterfly valves 64 in each passageway control the flow of air through the passageways. The passageways are mounted on an annular member 66 and together they constitute a fixed inner surface of the plenum.

It should be understood that the invention is not limited to the particular embodiment shown and described herein, but that various changes and modifications may be made without departing from the spirit or scope of this concept as defined by the following claims.

We claim:

1. In a pneumatic system for an aircraft using a circulation control rotor, said aircraft having a helicopter rotor assembly including drive means connected to rotor blades, said pneumatic system including a compressed air storage chamber surrounding said drive means and having a top wall, a bottom wall, an inner circumferential wall and an outer circumferential wall, and ducting for conducting air from said storage chamber to said rotor blades, characterized in that said top wall, bottom wall and outer circumferential wall are mounted in a stationary manner relative to said helicopter airframe, said inner circumferential wall being freely rotatable with respect to said top, bottom and outer circumferential walls, said ducting being connected to said inner circumferential wall radially inward from said wall and between said wall and said drive means and also being connected to said blades, said inner circumferential wall including a first level of passageways through which air is admitted to said ducting and the leading edge of said rotor blades and a second level of passageways through which air is admitted to said ducting and the trailing edge of said rotor blades.

* * * * *